April 9, 1935.     G. MAIURI     1,997,151
SOLIDIFYING CARBON DIOXIDE
Filed Oct. 13, 1934
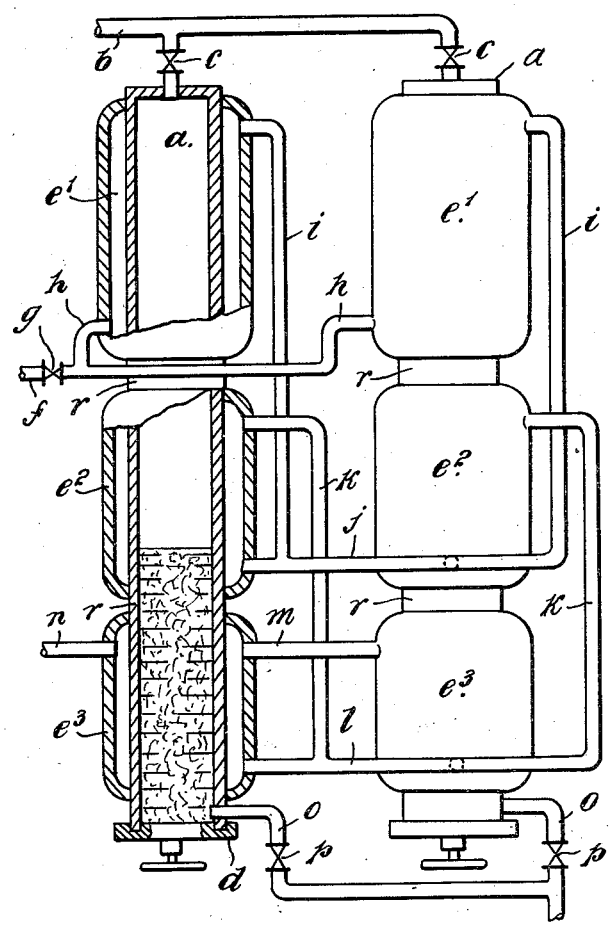
INVENTOR
GUIDO MAIURI
BY: Francis E. Boyce
ATTORNEY Patented Apr. 9, 1935

1,997,151

UNITED STATES PATENT OFFICE 1,997,151

SOLIDIFYING CARBON DIOXIDE

Guido Maiuri, Aldwych, London, England, assignor to Maiuri Refrigeration Patents Limited, London, England Application October 13, 1934, Serial No. 748,155
In Great Britain October 24, 1933

5 Claims. (Cl. 62—121)

This invention relates to a method of and moulds for solidifying carbon dioxide, and its object is to cause carbon dioxide to be frozen into dense blocks.

For the above purpose, according to the invention, carbon dioxide is admitted into a mould at a pressure above the triple point pressure and at a temperature above the liquefaction temperature corresponding to the pressure, and the internal surface of the mould is maintained at a temperature which decreases downwards along the internal surface of the mould from above to below the solidification temperature.

If carbon dioxide is admitted into the top of a mould at a temperature above the liquefaction point and at a pressure above the triple point pressure, and the internal surface of the wall of the mould is maintained at a temperature less than that of liquefaction but at the top greater than the solidification temperature, the carbon dioxide will condense as dew on the surface of the wall of the mould and coalesce into drops and flow down the surface and accumulate at the bottom. If also the temperature of the wall of the mould at the bottom is below the solidification temperature, the accumulating liquid carbon dioxide will freeze into a dense block of ice, as distinguished from snow.

By maintaining the pressure of the carbon dioxide but slightly above the triple point pressure, the difference between the liquefaction temperature and the solidification temperature can be kept small, for instance a maximum difference of the order of 5° to 6° C. Incidentally, the solidification temperature in such case will be approximately the triple point temperature.

It is obviously essential that the mould be colder at the bottom than at the top. This could be effected by cooling the mould indirectly through a bath of alcohol, itself cooled by refrigerating coils. This however would involve a temperature gradient or difference of 6° to 8° C. between the mould and the cooling coils, in order to ensure an effective extraction of heat from the mould. At the low temperatures involved for instance —57° C. to —61° C., a temperature gradient of 6° to 8° C. is obviously objectionable as it involves maintaining the cooling coils at an excessively low temperature which is not only additionally expensive but also difficult.

To avoid the temperature gradient involved by indirect cooling of the mould through a bath, direct cooling of the mould by jacketing the mould by a coil containing the evaporating refrigerating agent can be adopted. With such jacketing, however, to maintain the mould colder at the bottom than at the top, which is required in order to produce solely condensation of carbon dioxide at the top and freezing of the liquid carbon dioxide at the bottom, it is necessary to apply suction to the bottom of the coil to cause evaporation to take place there at the lower temperature. This will produce interruptions in the area of the surface of the coil wetted by the refrigerant, with consequential serious interference with conduction of heat from the mould. Moreover with coils in parallel uniformity of flow through all the coils is rendered almost impossible.

On the other hand continuity of the wetted surface and thereby heat conductivity can be preserved, and uniform cooling of a large number of moulds connected in parallel can be obtained, by employing a flooded system wherein the liquid refrigerant is admitted to the cooling coil at the bottom and evaporated by suction applied to the top thereof. This arrangement, however, would cause the mould or moulds to be colder at the top than at the bottom which is the contrary to what is required.

The above described disadvantages and difficulties are avoided and overcome by employing a mould, for producing dense solid carbon dioxide from carbon dioxide at a pressure above the triple point, which is cooled by being directly jacketed with a refrigerant in vertically interrupted sections each of which is supplied with refrigerant at the bottom and each of which is subjected to pressure reduction at the top, such that the mean temperature of each section is that suitable to its situation on the mould and progressively lower than that of the section immediately above.

Conveniently and preferably, the refrigerant in each section of the jacket is not directly drawn off at the top of such section, but overflows into the bottom of the next section beneath, until it reaches the bottom section, from which it is directly drawn off at the top.

By the above described superposed sectional jacketing, the advantage of good heat conductivity of a flooded system of jacketing can be obtained, without the accompanying lower temperature at the top than the bottom of each section being a hindrance to successful working, if the height of each section of jacket is kept such that the difference in temperature between top and bottom is small.

With, as is almost invariably the case in practice, jackets of moulds supplied with refrigerant in parallel, uniformity of flooding is ensured by interconnecting the bottoms of all the jacket sections of all the moulds at each level.

Each section of jacket is preferably separated from the adjoining section by a small vertical interval such that whilst the temperatures can be equalized by flow of heat along the intervening wall of the mould, there is little direct exchange of temperatures between sections.

The height of the top jacket section may exceed that of lower sections as a certain minimum total height is necessary to ensure an initial equal flow of liquid refrigerant and equal cooling by the flooded system in a plurality of moulds connected in parallel.

A set of sectionally jacketed moulds as above described and of which only the front two are visible the remainder being thereby hidden, is illustrated in sectional elevation by way of example on the accompanying drawing, in which:—

$a$ are moulds, to which carbon dioxide gas at a pressure slightly above the triple point pressure is admitted at the top by a pipe $b$, branched to the several moulds, the branches of the pipe being individually provided with stop cocks $c$. Alternatively, a single stop cock may be provided for a set of moulds.

The bottoms of the moulds $a$ are closed by removable covers $d$.

The wall of each mould is surrounded by three vertically separated jackets $e^1$, $e^2$, $e^3$. Liquid refrigerant, such as liquid ammonia, is supplied by a pipe $f$, having a regulating valve $g$, to branch pipes $h$ connected to the bottom of each of the top jackets $e^1$.

Pipes $i$ connect the tops of each of the top jackets $e^1$ to the bottoms of the corresponding intermediate jackets $e^2$, which also are interconnected at this level by pipes $j$. Similarly, pipes $k$ connect the tops of each of the intermediate jackets $e^2$ to the bottoms of the corresponding bottom jackets $e^3$, which likewise are interconnected at this level by pipes $l$.

The tops of each bottom jacket $e^3$ are interconnected by pipes $m$ and all are connected by a pipe $n$ to a region of extremely low subatmospheric pressure, such as a suitable absorber of an absorption refrigerating machine which supplies the liquid refrigerant by the above-mentioned pipe $f$.

On starting or for testing, the moulds are vented of carbon dioxide gas by pipes $o$ fitted with stop cocks $p$.

The liquid refrigerant floods the several jackets $e^1$, $e^2$, $e^3$ and also evaporates therein. As, however, the evaporation in the top jackets $e^1$ and in the intermediate jackets $e^2$ is effected against the static pressure head of the liquid refrigerant in the lower jacket or jackets $e^2$ and $e^3$, the evaporating pressures and therefore the mean temperatures in the jackets $e^1$ will be higher than in the jackets $e^2$, and higher in the jackets $e^2$ than in the jackets $e^3$. The temperature in the moulds $a$ will therefore decrease from the top of the mould to the bottom.

The temperature of the moulds where surrounded by the top jackets $e^1$ is arranged to be below the liquefying temperature of carbon dioxide at a pressure slightly above the triple point pressure, so that the carbon dioxide condenses there as dew on the walls of the moulds and eventually flows down in drops. The temperatures in the moulds where surrounded by the jackets $e^2$ and $e^3$ is arranged to be below the solidification temperature of the carbon dioxide whereby the drops of liquid carbon dioxide collecting in this region become frozen into a block of ice $q$.

The intervals $r$ between the adjoining jackets $e^1$ and $e^2$ and $e^2$ and $e^3$ are sufficient to prevent direct exchange of temperatures between the jackets whilst being sufficiently narrow to prevent the mould becoming hotter at these intervals.

In a representative example of working and construction, carbon dioxide gas is admitted to the top of each mould $a$ at a pressure of 6 atmospheres absolute. A temperature of $-56°$ C. is maintained at the bottom of each top jacket $e^1$, two feet six inches in height, and a temperature of $-58°$ C. at the top thereof, the mean temperature therefore being $-57°$ C. In this upper part of the mould the heat transmission from the carbon dioxide condensing on the walls and flowing down in liquid form is much higher than in the lower part, and for this reason a more energetic ebullition in the liquid refrigerant occurs, which causes a smaller drop of temperature relatively to the height than in the lower jackets. Each middle jacket $e^2$, one foot six inches in height, has a temperature of $-58°$ C. at the bottom and $-60°$ C. at the top and a mean temperature of $-59°$ C. Each bottom jacket $e^3$, also one foot six inches in height, has a temperature of $-60°$ C. at the bottom and $-62°$ C. at the top and a mean temperature of $-61°$ C.

The above temperatures can be obtained with jackets of the heights mentioned, if the jackets are filled with liquid ammonia of a density of 0.6 giving the required static pressure heads, and a suction pressure equal to 2000 m/m of water is applied to the outlet pipe $n$. This will give the temperature of $-62°$ C. at the top of the jackets $e^3$. The increase of pressure to 2300 m/m of water at the bottom of the jackets $e^3$ will give the temperature of $-60°$ C. At the bottom of the jackets $e^2$ the pressure will be 2600 m/m of water and the temperature $-58°$ C., and at the bottom of the jackets $e^1$ the pressure will be 3000 m/m of water and the temperature $-56°$ C.

The difference in temperature between the bottom and top of each jacket will become less if the amount of refrigerant vaporized is increased relatively to the volumetric capacity of each jacket, for instance by having jackets of narrow cross section, because in such case the formation of foam in each jacket will increase, thus reducing the static pressure head of liquid therein and the restraint to vaporization.

I claim:

1. A method of solidifying carbon dioxide consisting in admitting into a mould carbon dioxide at a pressure slightly above the triple point pressure of carbon dioxide and at a temperature above the liquefaction temperature of carbon dioxide at said pressure, and maintaining the internal surface of said mould at a temperature which decreases downwards along said internal surface from above to below the solidification temperature of carbon dioxide at said pressure.

2. In a mould for the solidification of carbon dioxide, jackets embracing said mould at vertical intervals, means for supplying liquid refrigerant to the bottom of each of said jackets, and means for withdrawing refrigerant from the top of each of said jackets.

3. In a mould for the solidification of carbon dioxide, jackets embracing said mould at vertical intervals, means for supplying liquid refrigerant to the bottom of the topmost of said jackets, means connecting the top of each of said superposed jackets to the bottom of the jacket next beneath, and means for withdrawing refrigerant from the top of the lowermost of said jackets.

4. In a set of moulds for the solidification of carbon dioxide, jackets embracing each of said moulds at vertical intervals, means interconnecting the bottom of each of said jackets at each of said vertical intervals, means for supplying liquid refrigerant to the bottom of each of said jackets, and means for withdrawing refrigerant from the top of each of said jackets.

5. In a set of moulds for the solidification of carbon dioxide, jackets embracing each of said moulds at vertical intervals, means interconnecting the bottom of each of said jackets at each of said vertical intervals, means for supplying liquid refrigerant to the bottom of the topmost of each of said jackets, means connecting the top of each of said superposed jackets to the bottom of the jacket next beneath, and means for withdrawing refrigerant from the top of the lowermost of said jackets.

GUIDO MAIURI.